United States Patent
Greber et al.

(10) Patent No.: US 10,738,714 B2
(45) Date of Patent: Aug. 11, 2020

(54) VALVE FOR A VEHICLE EXHAUST LINE

(71) Applicant: Faurecia Systemes D'Echappement, Nanterre (FR)

(72) Inventors: Frederic Greber, Ecot (FR); Gilbert Jean Delplanque, Souchaux (FR)

(73) Assignee: Faurecia Systemes D'Echappement (FR)

( * ) Notice: Subject to any disclaimer, the term of this patent is extended or adjusted under 35 U.S.C. 154(b) by 79 days.

(21) Appl. No.: 15/436,906

(22) Filed: Feb. 20, 2017

(65) Prior Publication Data

US 2017/0241349 A1 Aug. 24, 2017

(30) Foreign Application Priority Data

Feb. 22, 2016 (FR) ...................................... 16 51428

(51) Int. Cl.
| | | |
|---|---|---|
| *F02D 9/04* | (2006.01) | |
| *F16K 1/22* | (2006.01) | |
| *F02D 9/10* | (2006.01) | |
| *F16K 1/20* | (2006.01) | |
| *F16K 31/04* | (2006.01) | |

(52) U.S. Cl.
CPC ............... *F02D 9/04* (2013.01); *F02D 9/106* (2013.01); *F16K 1/2028* (2013.01); *F16K 1/224* (2013.01); *F16K 31/041* (2013.01); *F01N 2240/02* (2013.01); *F01N 2240/36* (2013.01)

(58) Field of Classification Search
CPC .......... F02D 9/04; F02D 9/106; F16K 1/2028; F16K 1/224; F16K 31/041; F01N 2240/02; F01N 2240/36
See application file for complete search history.

(56) References Cited

U.S. PATENT DOCUMENTS

| | | | | |
|---|---|---|---|---|
| 9,022,351 B2 * | 5/2015 | Zlindra | ................. | F16K 49/005 123/337 |
| 9,291,273 B2 * | 3/2016 | Lurk | ...................... | F16K 1/224 |
| 2009/0200505 A1 * | 8/2009 | Elsasser | ............... | F02D 9/1005 251/305 |
| 2011/0265466 A1 * | 11/2011 | Ikeda | ....................... | F02D 9/04 60/324 |
| 2013/0168590 A1 | 7/2013 | Zlindra | | |
| 2013/0213606 A1 | 8/2013 | Greber | | |
| 2014/0251579 A1 * | 9/2014 | Sloss | ........................ | F01N 5/02 165/96 |

(Continued)

FOREIGN PATENT DOCUMENTS

| | | |
|---|---|---|
| DE | 10006795 A | 2/2001 |
| DE | 202008005992 U1 | 9/2008 |
| DE | 202007006463 U1 | 10/2008 |

OTHER PUBLICATIONS

Search Report from parent application, FR 1651428, dated Sep. 27, 2016.

*Primary Examiner* — Matthew T Largi (74) *Attorney, Agent, or Firm* — Carlson, Gaskey & Olds, P.C.

(57) ABSTRACT

A valve comprises a valve body, a flap, and a shaft driving the flap. At least one first bearing guides a first end of the shaft. The first end of the shaft includes an inner housing emerging axially. The first bearing includes a barrel axially engaged in the inner housing, such that no accumulation of condensates can occur in the inner housing when the first end of the shaft points downward.

18 Claims, 4 Drawing Sheets

(56) References Cited

U.S. PATENT DOCUMENTS

| | | | |
|---|---|---|---|
| 2014/0312258 A1 | 10/2014 | Kato | |
| 2015/0083956 A1* | 3/2015 | Gerards | F02D 9/04 251/308 |
| 2015/0267656 A1* | 9/2015 | Hasegawa | F02B 27/0252 123/184.59 |
| 2018/0142790 A1* | 5/2018 | Rybarz | F16K 1/224 |

* cited by examiner

VALVE FOR A VEHICLE EXHAUST LINE

CROSS-REFERENCE TO RELATED APPLICATIONS

This application claims priority to FR 16 51428, filed Feb. 22, 2016.

BACKGROUND

The invention generally relates to valves for vehicle exhaust lines.

More specifically, according to a first aspect, the invention relates to a valve for a vehicle exhaust line, of the type comprising: a valve body inwardly defining a passage for the exhaust gases; a flap arranged in the passage; a shaft connected to the flap and having first and second ends opposite one another; at least one first bearing connected to the valve body and arranged to guide the rotation of the first end of the shaft relative to the valve body such that the flap is rotatable relative to the valve body around a rotation axis.

Such a valve is frequently arranged with the first bearing turned downward, i.e., toward the rolling surface of the vehicle. A drive motor of the flap in this case is typically placed above the valve body, and is therefore protected from projections of water or solid materials coming from the rolling surface. In the valves of the state of the art, it was observed that the first end of the shaft could deteriorate quickly.

SUMMARY

In this context, the invention aims to propose an exhaust line valve that does not have this flaw.

To that end, the invention comprises a valve where a first end of the shaft includes an inner housing opening axially, the first bearing including a barrel axially engaged in the inner housing.

Thus, when the first end of the shaft points downward, no accumulation of condensates can occur in the inner housing receiving the barrel of the first bearing.

Indeed, in a valve whose first bearing includes a cylindrical housing guiding the first end of the shaft, condensates can accumulate in this cylindrical housing. Such condensates may become acidic, with a pH of less than 2. If the vehicle is used only for short distances, these condensates are not evaporated. Due to their acidity, they attack the first end of the shaft and cause significant corrosion thereof.

If the vehicle travels near the sea, the condensates include dissolved salt, which ultimately crystallizes. The salt crystals wear the first end of the shaft by friction.

The valve according to the invention makes it possible to eliminate these problems.

The valve may also have one or more of the features below, considered individually or according to any technical possible combination(s). The shape of the barrel is a cylinder of revolution around the rotation axis. The barrel is radially defined by a lateral surface having a convex shape in section in a plane including the rotation axis. The barrel is radially defined by a lateral surface having an arc-of-circle shape in section in a plane including the rotation axis. The arc of circle has a radius comprised between 30 and 150 mm. The barrel is engaged in the inner housing with a radial play comprised between 0.05 and 0.5 mm. The second end of the shaft has a shoulder. The valve includes a sealing ring slipped around the second end of the shaft and which has a radially inner surface bearing against the shoulder along a linear contact zone with a closed contour. The radially inner surface, considered in section in a plane containing the rotation axis, is convex, preferably an arc of circle or an ellipse arc. The radially inner surface has a frustoconical general shape, coaxial to the rotation axis, and forming an angle comprised between 30° and 60° with the rotation axis. The valve includes a second bearing connected to the valve body and arranged to guide the rotation of the second end of the shaft relative to the valve body, the second bearing having an orifice with a given inner diameter. The second end of the shaft is engaged in the orifice and has an outer diameter equal to the inner diameter minus a play comprised between 0.1 and 1 mm. The valve comprises a sleeve made from an elastic material that is inserted between the barrel and an inner surface of the inner housing.

According to a second aspect, the invention pertains to a vehicle exhaust line equipped with a valve having the above features.

According to a third aspect, the invention pertains to a vehicle including an exhaust line equipped with a valve having the above features and arranged such that the first end of the shaft points toward a rolling surface of the vehicle.

BRIEF DESCRIPTION OF THE DRAWINGS

Other features and advantages of the invention will emerge from the following detailed description, provided for information and non-limitingly, in reference to the appended Figures, in which.

DETAILED DESCRIPTION

Figure 1:
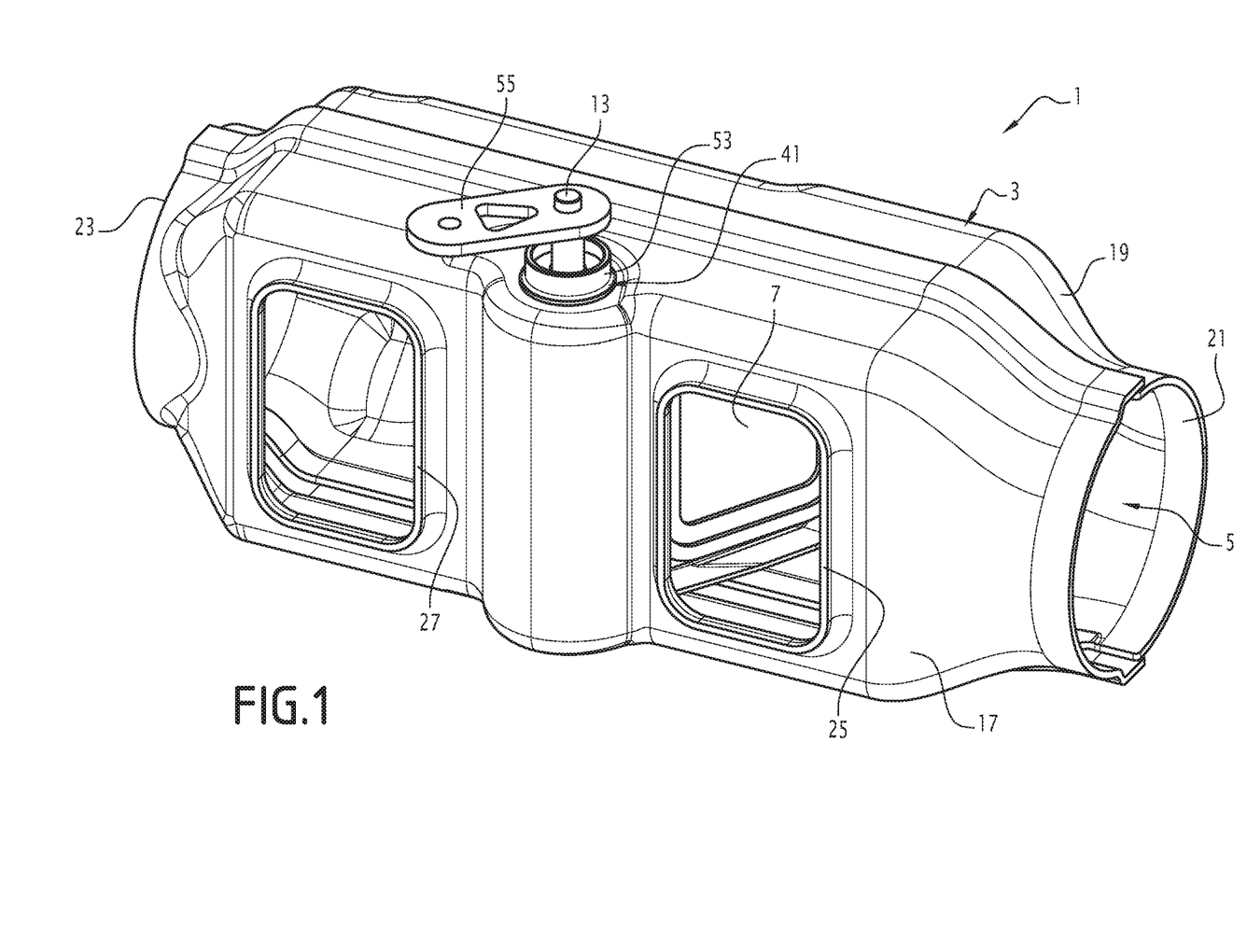
FIG. 1 is a perspective view of a valve according to the invention.

The valve 1 shown in FIG. 1 is designed to be installed inside a vehicle exhaust line.

Typically, this vehicle is a motor vehicle, for example a car or truck.

The valve is a two-way valve, or a three-way valve, or any other suitable type. It is, for example, of the all or nothing type, or on the contrary a proportional valve, able to be moved between a plurality of positions making it possible to modulate the exhaust gas flow rate through the valve.

The valve 1 comprises a valve body 3 inwardly defining a passage 5 for the exhaust gases, a flap 7 arranged in the passage 5, and a shaft 9 connected to the flap 7. The shaft 9 has first and second ends 11, 13 opposite one another.

The flap 7 is rotatable relative to the valve body 3 around a rotation axis X. The shaft 9 extends along the rotation axis X.

To move the flap 7, the valve 1 typically includes an actuator 15 arranged to rotate the shaft 9.

In the illustrated example, the valve body 3 includes two valve half-bodies 17, 19 rigidly fastened to one another and substantially tight against the exhaust gas.

The valve half-bodies 17, 19 are stamped half-shells. The valve half-bodies 17, 19 have a concave shape, the concave sides facing one another. The half-bodies 17, 19 are defined by respective free edges attached against one another and fastened to one another using any suitable method, for example by welding lines.

Alternatively, the valve body 3 is molded.

The valve body 3 has an exhaust gas inlet 21 and outlet 23. The passage 5 extends from the inlet 21 to the outlet 23. In the illustrated example, the inlet 21 and the outlet 23 are each defined in part by the half-body 17 and in part by the half-body 19.

In the illustrated example, the valve 1 is integrated into a heat recovery device.

To that end, the valve body 3 includes a first opening 25, provided to allow the exhaust gases to circulate from the passage 5 toward a heat exchanger, not shown. The valve body 3 also includes a second opening 27, allowing the exhaust gases to return from the heat exchanger and enter the passage 5.

The first and second openings 25, 27 are arranged on the half-body 17, for example.

A heat recovery device of this type is described in FR 2,966,873.

In the example shown in FIG. 1, the flap 7 is movable relative to the valve body 3 between a closing position in which the flap 7 closes off a cutoff section of the passage 5, and a freed position in which the flap 7 frees the cutoff section. The cutoff section is situated between the first and second openings 25, 27.

In the closing off position, the flap 7 therefore prevents the exhaust gases from circulating from the inlet 21 to the outlet 23 along the passage 5, and therefore forces the exhaust gases to circulate inside the heat exchanger.

In the freed position, the flap 7 allows the exhaust gases to circulate from the inlet 21 toward the outlet 23 along the passage 5, without passing through the heat exchanger.

For example, in the freed position, the flap 7 closes off the second opening 27.

Alternatively, the valve 1 is not associated with a heat recovery device. In this example, the valve 1 does not include the first and second openings 25, 27.

The shaft 9 is rigidly connected to the flap 7 and rotates the latter. In the illustrated example, the shaft 9 is rigidly fastened to one edge of the flap 7. Alternatively, the valve 1 is of the butterfly type, and the shaft 9 is connected to the flap 7 along a line of symmetry dividing the flap 7 into two symmetrical halves. The valve 1 may be of any other appropriate type.

Figure 2:
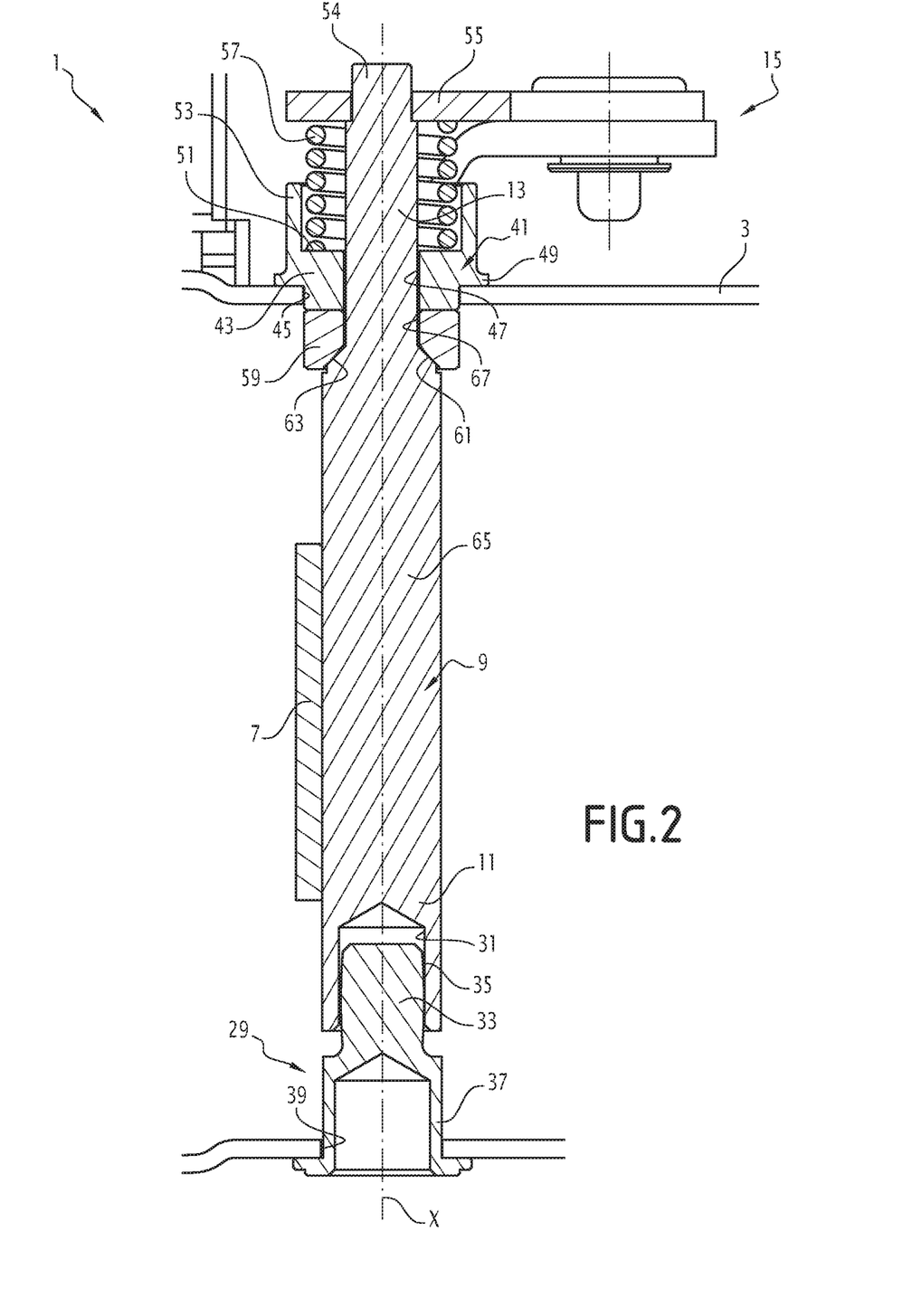
FIG. 2 is a sectional view of the valve of FIG. 1, in a plane containing the rotation axis of the valve.
Figure 3:
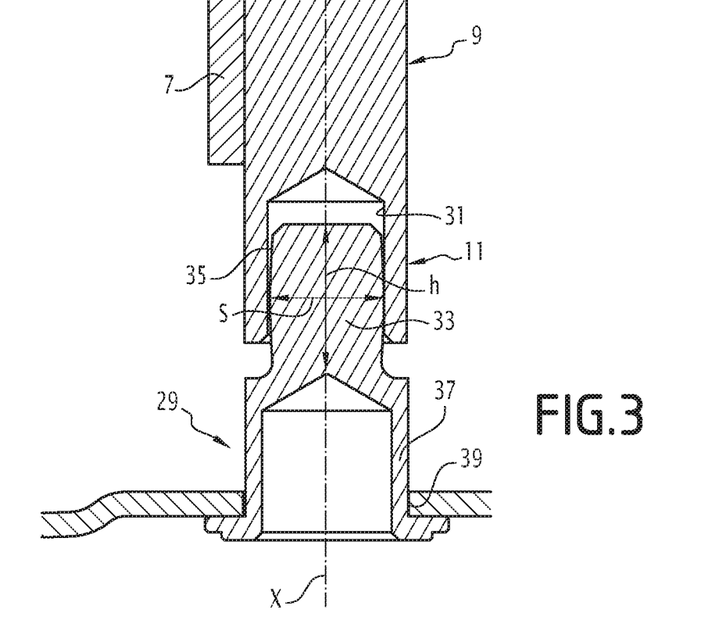
FIG. 3 is an enlarged view of the first bearing and the end part of the shaft.

As in particular shown in FIGS. 2 and 3, the valve 1 includes a first guide bearing 29 arranged to guide the rotation of the first end 11 of the shaft 9 relative to the valve body 3.

To that end, the first end 11 of the shaft 9 includes an inner housing 31 having an axially extending opening. The first bearing 29 includes a barrel 33 axially engaged in the inner housing 31.

In the illustrated example, the inner housing 31 is blind. Alternatively, the shaft 9 is hollow. In this example, the inner housing 31 would therefore extend over substantially the entire length of the shaft 9.

The inner housing 31 typically has a circular section, perpendicular to the axis X. In this case, it is coaxial to the axis X.

The barrel 33, preferably, has a cylindrical shape of revolution around the axis X.

Typically, the barrel 33 is radially defined by a lateral surface 35 having a convex shape in section in a plane containing the rotation axis X.

Advantageously, the lateral surface 35 has an arc-of-circle shape in section in a plane containing the rotation axis X, as illustrated in FIGS. 2 and 3. This arc of circle advantageously has a large radius, comprised between 30 and 150 mm. Preferably, the radius is comprised between 40 and 100 mm, and is for example equal to 50 mm.

The radius is chosen based on the size of the valve 1, in particular the length of the shaft 9, the diameter of the shaft 9, assembly constraints, and thermal constraints.

If the radius is too small, the contact between the inner surface of the inner housing 31 and the lateral surface 35 of the barrel 33 occurs on a limited surface area, which causes pronounced wear of this contact zone. Thus, the quality of the guiding of the first end 11 of the shaft 9 may be rapidly deteriorated in this case.

On the contrary, if the radius is too large, the shape of the barrel 33 prevents any misalignment between the shaft 9 and the first bearing 29. Such a misalignment may result from a welding operation of the first bearing 29 on the valve body 3, or from geometric flaws in the parts of the system. The misalignment may also be due to the deformation of the valve body 3 at high temperatures, or may result from the splashing of the valve body 3 when the vehicle goes through a puddle. Indeed, when the first bearing 29 is turned toward the rolling surface, the zone of the valve body 3 supporting the first bearing 29 is splashed when the vehicle goes through a puddle, while the opposite zone of the valve body 3 is protected. The zone of the valve body 3 supporting the first bearing 29 is cooled abruptly, while the opposite zone retains its initial temperature. This causes a deformation of the valve body 3, which may create a misalignment between the shaft 9 and the first bearing 29.

Choosing the radius between 30 and 150 mm makes it possible to have a contact zone between the barrel 33 and the inner surface of the inner housing 31 with a large surface area. Initially, the contact zone between the lateral surface 35 and the inner surface of the inner housing 31 substantially corresponds to a circle and is linear. However, this contact zone quickly becomes larger due to the wear and deformation of the barrel 33. The contact zone thus quickly has a large surface area, such that the wear of this zone is not very pronounced.

The barrel 33 is generally roll-shaped. More specifically, the barrel 33 has, perpendicular to the rotation axis X, a maximum straight section situated substantially mid-height relative to the barrel 33. The height here is considered along the axis X. The maximum section S is embodied in FIG. 3. The straight section decreases from the section S, following the barrel 33 axially toward the center of the passage 5 and following the barrel 33 axially toward the valve body 3.

The barrel 33 is engaged in the inner housing 31 with a radial play comprised between 0.05 and 0.5 mm, preferably comprised between 0.07 and 0.3 mm, and for example equal to 0.1 mm.

The radial play corresponds to the difference between the outer radius of the barrel 33 and the inner radius of the inner housing 31, considered at the maximum section S.

If the radial play is too small, jamming of the shaft 9 may occur at high temperatures, due to the differential expansion between the shaft 9 and the first bearing 29. Indeed, the shaft 9 is in thermal contact with the exhaust gases over substantially its entire length, while the first bearing 29 is fastened on the valve body 3, which is relatively colder than the shaft 9 due to the fact that the valve body 3 is in contact with the atmosphere by its outer side.

On the contrary, if the radial play is too great, the guiding of the first end 11 of the shaft 9 is ensured imprecisely, and vibrations may occur generating noise and wear.

As shown in FIGS. 2 and 3, the first bearing 29 includes a base 37 engaged in a hole 39 of the valve body 3. The base 37 sealably closes off the hole 39. The barrel 33 extends axially from the base 37 toward the center of the valve body 3.

The valve 1 also includes a second bearing 41 connected to the valve body 3, arranged to guide the rotation of the second end 13 of the shaft 9 relative to the valve body 3.

In the example illustrated in FIG. 2, the second bearing 41 includes a cylindrical part 43 engaged in a hole 45 of the valve body 3. The second bearing 41 has an orifice 47 in which the second end 13 of the shaft 9 is engaged. This orifice 47 is defined by the cylindrical part 43. The second bearing 41 also includes a protruding collar 49, protruding radially outward from the cylindrical part 43. The collar 49 is tightly welded on an outer surface of the valve body 3, around the hole 45.

The second bearing 41 bears a cylindrical rib 53 on an end surface 51 substantially perpendicular to the axis X.

The second end 13 of the shaft 9 has a terminal portion 54 that protrudes past the rib 53. The actuator 15 includes a lever 55, rigidly fastened to the terminal portion 54. The lever 55 is provided to be connected to a motor, via a kinematic chain, not shown.

The valve 1 also includes a compression spring 57 inserted axially between the lever 55 and the end surface 51. In the illustrated example, the compression spring 57 is a helical spring wound around the second end 13 of the shaft 9, the spring 57 bearing on one side on the end surface 51 and on the other side on the lever 55. The rib 53 surrounds the spring 57.

The valve 1 also includes a sealing ring 59 slipped around the second end 13 of the shaft 9. The sealing ring 59 has a radially inner surface 61 bearing against a shoulder 63 arranged on the first end of the shaft 9.

The radially inner surface 61 bears against the shoulder 63 along a linear contact zone with a closed contour.

More specifically, the sealing ring 59 is inserted between the shoulder 63 and the second bearing 41. The sealing ring 59 bears on the lower end of the cylindrical part 43, situated inside the valve body 3. The sealing ring 59 and the second bearing 41 bear against one another by respective annular surfaces, substantially perpendicular to the rotation axis X.

The shoulder 63 corresponds to a transition in the shaft 9, the diameter of the shaft 9 becoming smaller from a central segment 65 of the shaft, bearing the flaps 7, toward the second end 13. In other words, the diameter of the second end 13 is smaller than the diameter of the central segment 65 of the shaft 9.

The shoulder 63 has a frustoconical general shape, coaxial to the rotation axis X. The shoulder 63 forms an angle with the rotation axis X comprised between 30 and 60°, for example equal to 45°.

The radially inner surface 61 of the sealing ring 59 also has a frustoconical general shape, with a diameter that becomes smaller from a lower axial end of the sealing ring 59, turned toward the center of the passage 5, toward an upper axial end of the sealing ring 59, in contact with the bearing 41.

The cone trunk forms an angle with the rotation axis X substantially identical to that of the shoulder 63. This angle is thus comprised between 30 and 60°, and is preferably equal to 45°.

The radially inner surface 61 of the sealing ring 59, with a generally frustoconical shape, extends by a cylindrical inner surface 67, with the same diameter as the orifice 47 of the second bearing 41.

The radially inner surface 61 is not strictly frustoconical and, considered in section in a plane containing the rotation axis X, is preferably convex. Advantageously, the radially inner surface 61, considered in section in a plane containing the rotation axis X, is an arc of circle or an ellipse arc. Thus, the bearing between the shaft 9 and the sealing ring 59 is linear, even if the shaft 9 is not strictly perpendicular to the ring 59. Such an arrangement allows the shaft 9 to rotate relative to the second bearing 41, in case of misalignment between the shaft 9 and the second bearing 41.

The diameter of the arc of circle is, for example, comprised between 6 and 10 mm, and is for example equal to 8 mm.

Furthermore, the orifice 47 of the second bearing 41 has a given inner diameter. The second end 13 of the shaft 9 has an outer diameter equal to said inner diameter minus a play comprised between 0.1 and 1 mm. This play is, preferably, comprised between 0.2 and 0.6 mm, and is for example equal to 0.3 mm. Such play allows a misalignment of the shaft 9 relative to the first bearing 41 in case of deformation of the valve body 3. This deformation may come from the welding of the first bearing 41 on the valve body 3, or be related to the heating of the valve 1 due to the circulation of the exhaust gases, or be related to the differential expansion between two opposite zones of the valve body 3 due to the spraying of the zone of the valve body 3 turned toward the rolling surface. The sealing of the valve 1 is obtained on the one hand owing to the linear bearing between the sealing ring 59 and the shoulder 63 of the shaft, and on the other hand owing to the planar bearing of the sealing ring 59 on the second bearing 41.

Due to the compression force exerted by the spring 57, the shaft 9 and the lever 55 are axially stressed toward the outside of the valve body 3. This results in stressing the sealing ring 59 against the first bearing 41. Likewise, the shoulder 63 of the shaft 9 is stressed against the radially inner surface 61 of the sealing ring 59.

The force exerted by the spring 57 on the shaft 9 is about 30 Newton.

The shaft 9 is in a way suspended from the second bearing 41, the first bearing 29 serving only for rotational guiding. There is normally no force along the axial direction between the shaft 9 and the first bearing 29. The first bearing 29 only limits the travel of the first end 11 of the shaft 9 and sees to its rotational guiding.

The sealing ring 59 is, for example, made from silicon nitride (Si3N4), a zirconium-based material (SrO2), silicon carbide (SC), or alumina (Al2O3). The first and second bearings 29, 41 and the shaft 9 are made from steel.

As shown in FIG. 1, the first and second bearings 29, 41 are rigidly fastened to the same half-body, which is the half-body 17 in the illustrated example. This makes it possible to decrease the alignment and parallelism allowances.

Figure 4:
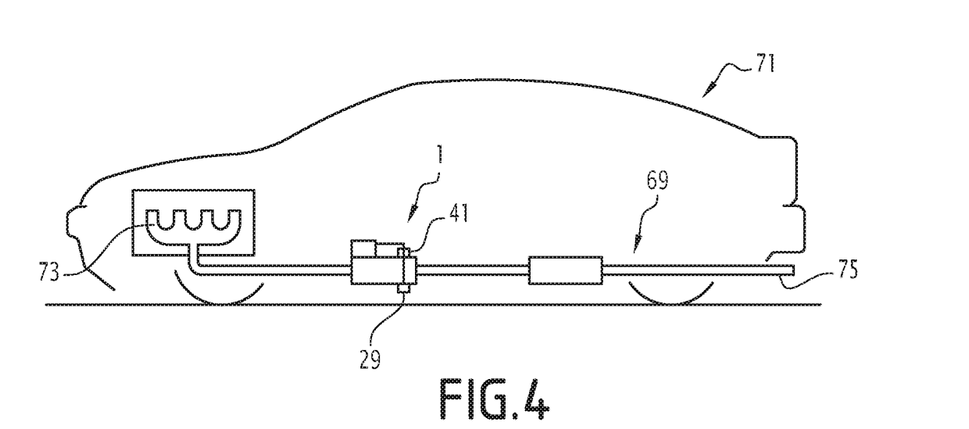
FIG. 4 is a simplified schematic illustration of a motor vehicle whose exhaust line is equipped with the valve of FIG. 1.

As shown in FIG. 4, the valve 1 is provided to be arranged in an exhaust line 69 of a motor vehicle 71.

Preferably, the shaft 9 is mounted with an orientation substantially perpendicular to the rolling plane of the vehicle 71. The first bearing 29 is placed toward the rolling plane of the vehicle 71, while the second bearing 41 is placed facing the other way.

The inlet 21 of the valve body 3 is connected to an exhaust collector 73 capturing the exhaust gases leaving the combustion chambers of the vehicle's engine. The outlet 23 is fluidly connected to a cannula 75 making it possible to release the exhaust gases into the atmosphere.

Figure 5:
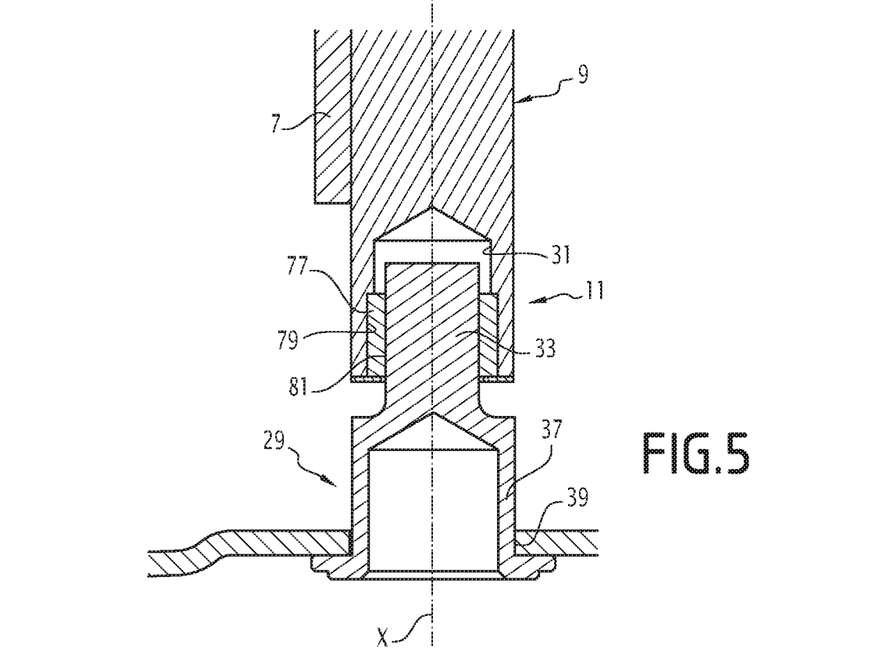
FIG. 5 is a view similar to FIG. 3, showing an alternative embodiment of the invention.

An alternative embodiment of the invention is illustrated in FIG. 5. Only the points by which this alternative differs from that of FIGS. 1 to 3 will be outlined below. Identical elements, or elements performing the same function, will be designated using the same references in both alternatives.

As shown in FIG. 5, the valve 1 comprises a sleeve 77 made from an elastic material, inserted between the barrel 33 and an inner surface 79 of the inner housing 31.

The sleeve 77 has a cylindrical shape, coaxial with the axis X. The sleeve 77 is placed around the barrel 33. More specifically, it is radially inserted between an outer surface 81 of the barrel 33 and the inner surface 79.

The sleeve 77 is pressed against both the outer surface 81 and the inner surface 79.

The sleeve 77 is provided to allow the guiding of the first end 11 of the shaft 9, without preventing a misalignment from existing between the shaft 9 and the bearing 29.

When such a misalignment exists, for example when the shaft 9 rotates at its second end 13 and adopts an inclined orientation relative to the barrel 33, certain zones of the sleeve 77 are compressed, and the pressure exerted on other zones is decreased.

The sleeve 77 is, for example, made from a metal knit, preferably made with one or several stainless steel wires.

The wire(s) are typically made from austenitic steel or Inconel. For good compressive strength, the density of the knit must be at least 50%, and may reach 70%.

In the example of FIG. 5, the lateral surface 35 of the barrel is not convex. It is substantially cylindrical.

According to an alternative embodiment that is not shown, the roll-shaped barrel 33 extends axially toward the inside of the valve body 3 by a pin with a reduced diameter relative to the barrel. The lateral surface 35 of the barrel 33 has a convex section. An elastic sleeve, of the type described above in reference to FIG. 5, is slipped around the pin. It is compressed radially between the outer surface of the pin and the inner surface of the inner housing. This sleeve makes it possible to avoid vibrations and prevent the shaft from striking the barrel sharply.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A valve for a vehicle exhaust line, the valve comprising:
a valve body inwardly defining a passage for exhaust gases;
a flap arranged in the passage;
a shaft connected to the flap and having first and second ends opposite one another;
at least one first bearing connected to the valve body and arranged to guide rotation of the first end of the shaft relative to the valve body such that the flap is rotatable relative to the valve body around a rotation axis; and
wherein the first end of the shaft includes an inner housing opening axially, the first bearing including a barrel axially engaged in the inner housing, and wherein the barrel is radially defined by a lateral surface having a convex shape in section in a plane including the rotation axis, said convex shape being located inside the inner housing, and wherein the barrel has a maximum cross-section that is perpendicular to the rotation axis and that is surrounded by the inner housing, and wherein the barrel decreases in cross-section within the inner housing in opposing directions along the rotation axis from the maximum cross-section.

2. The valve according to claim 1, wherein a shape of the barrel is a cylinder of revolution around the rotation axis.

3. The valve according to claim 1, wherein the lateral surface has an arc-of-circle shape in section in the plane including the rotation axis.

4. The valve according to claim 3, wherein the arc of circle has a radius between 30 and 150 mm.

5. The valve according to claim 1, wherein the barrel is engaged in the inner housing with a radial play between 0.05 and 0.5 mm.

6. The valve according to the claim 1, wherein the valve includes a second bearing connected to the valve body and arranged to guide rotation of the second end of the shaft relative to the valve body, the second bearing having an orifice with a given inner diameter, the second end of the shaft being engaged in the orifice and having an outer diameter equal to the inner diameter minus a play between 0.1 and 1 mm.

7. The valve according to the claim 1, wherein the valve comprises a sleeve made from an elastic material, inserted between the barrel and an inner surface of the inner housing.

8. A valve for a vehicle exhaust line, the valve comprising:
a valve body inwardly defining a passage for exhaust gases;
a flap arranged in the passage;
a shaft connected to the flap and having first and second ends opposite one another;
at least one first bearing connected to the valve body and arranged to guide rotation of the first end of the shaft relative to the valve body such that the flap is rotatable relative to the valve body around a rotation axis; and
wherein the first end of the shaft includes an inner housing opening axially, the first bearing including a barrel axially engaged in the inner housing, and wherein the second end of the shaft has a frustoconical shoulder that is coaxial to the rotation axis, the valve including a sealing ring slipped around the second end of the shaft and having a radially inner frustoconical surface coaxial to the rotation axis and that bears against the frustoconical shoulder.

9. The valve according to claim 8, wherein the radially inner frustoconical surface considered in section in a plane including the rotation axis is convex.

10. The valve according to claim 9, wherein the radially inner frustoconical surface forms an angle between 30° and 60° with the rotation axis.

11. The valve according to claim 8, wherein the frustoconical shoulder corresponds to a transition in the shaft, a diameter of the shaft along the frustoconical shoulder becoming smaller from a central segment of the shaft, bearing the flap, toward the second end.

12. The valve according to claim 8, wherein the frustoconical shoulder forms an angle with the rotation axis comprised between 30 and 60°.

13. The valve according to claim 8, wherein the radially inner frustoconical surface, considered in section in a plane containing the rotation axis, is an arc of circle or an ellipse arc, said arc of circle or ellipse arc contacting the frustoconical shoulder.

14. A vehicle comprising:
an exhaust line equipped with a valve; and
the valve including a valve body inwardly defining a passage for exhaust gases;

a flap arranged in the passage, a shaft connected to the flap and having first and second ends opposite one another, at least one first bearing connected to the valve body and arranged to guide rotation of the first end of the shaft relative to the valve body such that the flap is rotatable relative to the valve body around a rotation axis, wherein the first end of the shaft includes an inner housing opening axially, the first bearing including a barrel axially engaged in the inner housing, and wherein the valve is arranged such that the first end of the shaft points toward a rolling surface of the vehicle.

15. The valve according to claim 1, wherein the lateral surface having the convex shape extends in front of an inner surface of the inner housing.

16. The valve according to claim 1, wherein the lateral surface having the convex shape is a contact zone contacting an inner surface of the inner housing.

17. The valve according to claim 16, wherein the maximum cross-section is in the contact zone such that the contact zone is surrounded by the inner housing.

18. The valve according to claim 17, wherein a height of the barrel extends along the rotation axis, and wherein the maximum cross-section is situated substantially mid-height relative to the barrel.

* * * * *